United States Patent [19]

Handel et al.

[11] Patent Number: 5,345,397
[45] Date of Patent: Sep. 6, 1994

[54] OPTIMAL COMPOSITE CURING SYSTEM AND METHOD

[75] Inventors: Paul I. Handel, Medford, N.J.; Matthew J. Patterson, Bloomfield, Conn.; Daniel Guerin, Wilmington, Del.; Nicholas C. Strauss, West Chester, Pa.; Steven B. Helton, Mill Creek, Wash.; Thomas M. Barrett, Wilmington, Del.; Lisa K. Koelewyn, Lafayette Hill; James D. Waterman, Drexel Hill, both of Pa.

[73] Assignee: The Boeing Company, Seattle, Wash.

[21] Appl. No.: 796,933

[22] Filed: Nov. 25, 1991

[51] Int. Cl.$^5$ ............................................. B29C 35/02
[52] U.S. Cl. ..................................... 364/503; 364/476; 364/477; 264/40.1; 264/234; 425/30; 425/143
[58] Field of Search ............... 364/503, 477, 473, 476, 364/472, 577; 264/40.1, 40.5, 40.6; 425/143, 384, 30

[56] References Cited

U.S. PATENT DOCUMENTS

| | | | |
|---|---|---|---|
| 4,344,142 | 8/1982 | Diehr, II et al. | 364/473 |
| 4,455,268 | 6/1984 | Hinrichs et al. | 264/23 |
| 4,515,545 | 5/1985 | Hinrichs et al. | 425/143 |
| 4,551,807 | 11/1985 | Hsich et al. | 364/473 |
| 4,589,072 | 5/1986 | Arimatsu | 364/473 |
| 4,806,292 | 2/1989 | DeLacy | 264/40.6 |
| 4,810,438 | 3/1989 | Webster et al. | 264/40.6 |
| 4,828,472 | 5/1989 | Itoh et al. | 425/143 |
| 4,874,948 | 10/1989 | Cielo et al. | 250/341 |
| 4,980,234 | 12/1990 | Almer et al. | 428/414 |
| 5,055,245 | 10/1991 | Hisatomi et al. | 264/40.6 |
| 5,194,197 | 3/1993 | Munk et al. | 264/40.6 |

Primary Examiner—Thomas G. Black
Assistant Examiner—Tan Q. Nguyen
Attorney, Agent, or Firm—Jones, Tullar & Cooper

[57] ABSTRACT

An intelligent control system for directing a process for curing parts made of fiber-reinforced composite material in an autoclave. The system uses data gathered during the curing processing to calculate repetitively the temperature of the autoclave required to establish and maintain a predetermined cure temperature. The system accounts for heat generated by the exothermal reaction of the resin during polymerization. The control recalculates an optimal autoclave temperature at periodic intervals during the cure cycle on the basis of temperature data from the part being cured and temperature within the autoclave. The optimal autoclave temperature is determined from calculated values representing resin heat, maximum offset, lag time and degree of cure of the resin. Control signals produced by a computer that executes control algorithms stored in electronic memory accessible to the processor cause corresponding changes in the temperature of the autoclave needed to cure the part without overheating and in less time than with a conventional autoclave temperature control.

19 Claims, 9 Drawing Sheets

OPTIMAL COMPOSITE CURING SYSTEM AND METHOD

BACKGROUND OF THE INVENTION

1. Field of the Invention

This invention relates to the field of process control. More particularly it pertains to automated systems for controlling a heat source during a cure cycle in which a part formed of unpolymerized synthetic resin or B-staged resin impregnated fiber composite material is solidified by polymerizing the resin at elevated temperature.

2. Description of time Prior Art

Fibers such as those of glass, graphite, carbon, boron and organic fibers, such as KEVLAR, are used in combination with resin matrices, such as epoxy, to produce composite materials having particularly desirable properties, especially high stiffness and strength per unit weight.

Composite material is received by a manufacturer from the material supplier in the form of thin sheets called prepreg containing fibers impregnated with resin in a partially cured, intermediate reaction state, the B-stage. In the condition received by a manufacturer from the supplier, the resin reaction, or degree of cure, is about 12 percent completed. Continued reaction of the resin occurs with passage of time and is accelerated with increased temperature; therefore, to retard this reaction, the material is stored until use below room temperature. As the reaction advances, the resin polymerizes, i.e., polymers form and are cross linked until the resin is no longer plastic but solid. Accordingly, the lamina are cut to shape and laid one upon another in sufficient number to achieve a desired thickness while the prepreg is in the B-stage.

Usually the cure process occurs in a pressurized chamber or autoclave into which gas is admitted, heated, and pressurized under closely controlled conditions. The part is surrounded by a mold that defines its contour and shape, and in this environment the resin polymerizes, thereby solidifying the part to the shape of the mold.

The autoclave is pressurized moderately, gas in the autoclave is heated at a predetermined rate, the part temperature rises, and the resin reaction progresses. Pressure is applied and increased to control resin content, part thickness and to minimize porosity, which is the result of voids produced by release of volatile material, such as water vapor, during the curing process.

The chemical reaction during polymerization is exothermal, a release of heat energy. This heat adds to the heat supplied to the part by the ambient atmosphere in the autoclave and can cause overheating. The conventional technique for raising the part temperature in the autoclave is to heat the part slowly and/or to increase the temperature in steps. This method is inefficient, requires a large amount of heat, increases the length of the curing cycle, and requires additional costly tooling to lower processing time.

Various techniques have been used to control by use of a computer the temperature and heat rate of a curing press, furnace or autoclave in which rubber or synthetic resin is molded to shape or cured by heating in a controlled environment.

For example, U.S. Pat. No. 4,344,142 describes a process for determining the time to open a rubber molding press based on the temperature of the press during a heating period. The temperature of the press is determined periodically and read by a computer, which accesses information related to the temperature and time required to cure the compound being molded in the press. The computer determines, from the temperature of the press during the cure period and by calculation of the Arrhenius equation, the optimal time to open the press and terminate the cure. When that time is reached, the press is opened automatically, indicating completion of the cure.

The Arrhenius reaction speed equation is used also in the control system described in U.S. Pat. No. 4,589,072 to determine the chemical reaction amount in a rubber vulcanization reaction. The reaction amount is determined at several places within a reaction system on the basis of temperature signals representing temperatures at those locations. Average, maximum and minimum reaction amount values are determined and used to stop the calculation of reaction amount values when the temperature signal from a location is lower than a predetermined value.

U.S. Pat. Nos. 4,455,268 and 4,515,545 describe systems for controlling the cure process of fiber-reinforced composite materials. The attenuation of an ultrasonic wave introduced into the part being cured is used to determine viscosity of the part, which is compared to reference viscosity data and used to control temperature and pressure of the part in conformance with desired reference values for these variables.

The system of U.S. Pat. No. 4,828,472 controls heating elements and pressurizing devices so that temperature is equalized at various locations on the part being formed of composite material containing resin. The part, enveloped in a bag which is evacuated by a vacuum pump, is located in a pressurized autoclave. The part is heated radiantly by heating elements controlled by a computer. Heat is applied over time according to a predetermined schedule and cooling occurs after sufficient time at a predetermined curing temperature.

In the process described in U.S. Pat. No. 4,810,438 for controlling the cure of fiber-reinforced composite material, the controlling parameter for regulating the variables of the process is the state of the resin as expressed in percent gel, which provides an analytic method to monitor advancement of the resin during the cure. By test, the amount of heat energy required for full gellation is used to indicate the appropriate point where autoclave pressure is to be increased before full gellation.

None of the prior art nor any of these references describes a process for curing parts made of fiber-reinforced composite material in an autoclave with the aid of a digital computer that uses data acquired during processing to calculate repetitively the temperature of the autoclave by accounting for heat generated by the exothermal reaction of the resin during polymerization. The control of the present invention recalculates an optimal autoclave temperature at periodic intervals during the cure cycle on the basis of temperature data acquired at corresponding periodic intervals. The optimal autoclave temperature is determined from repetitively calculated values representing resin heat, maximum offset, lag time and degree of cure of the resin during execution of control algorithms stored in electronic memory accessible to the computer.

While the best mode for carrying out the invention has been described in detail, those familiar with the relevant art will recognize various alternative designs and embodiments for practicing the invention defined by the following claims.

SUMMARY OF THE INVENTION

There is a need for a method to accurately control the amount of heat added to the part during the cure cycle by accounting for the exothermal reaction heat so that the part can be processed quickly without overheating or use of unnecessary heat energy from an external source such as that supplied by an autoclave.

It is an object of this invention to provide a system and method that predicts the quantity of heat generated by polymerization of resin while curing a part made of prepreg composite material and using the exothermal energy to supply heat required to cure the part. This feature reduces the quantity of heat required in comparison with conventional cure cycle heating techniques. It reduces the cure cycle period, increases production flow rate, and lengthens mold tool service life.

The process of our invention decreases the number of tools required to accomplish a given production flow rate. It produces high quality parks of composite material by eliminating autoclave operator programming errors and processing errors.

Molding and curing resin composite material, such as those that include a thermosetting resin matrix reinforced with glass fibers, organic fibers, boron, graphite or carbon fibers, is performed according to this invention preferably in an autoclave. Layers of the composite material having an outer contour conforming to the shape of the part being formed are placed on a bag molding tool, one layer on another, until the required number of layers is reached and the part has the requisite thickness. Then, the part is covered with a bag of thin film, nylon or similar material. The bag is evacuated, the bagged part is placed in an autoclave and heated under pressure to cure and mold the part. The part is heated, by gas or radiant electrical energy, under pressure in the autoclave.

The curing apparatus is actuated in response to signals produced by the control system of the invention, which includes analog or digital sensors for producing signals representing temperature of the part, temperature of the autoclave atmosphere, pressure within the bag that surrounds the part, and autoclave pressure. These signals are converted to digital form and supplied to input ports or signal conditioning circuits connected to input ports of a computer or microprocessor having accessible electronic memory containing process data, control algorithms and process variable data used during execution of process control algorithms. The computer includes a central processing unit where arithmetic functions and logic functions are executed. Control signals resulting from execution of the algorithms are presented at output ports connected to process equipment that responds to the output control signals.

Process data is read periodically, preferably every 30 seconds or so, and critical control variables are calculated in real time on the basis of the new data. The system sets the autoclave temperature control for the succeeding 30 second interval on the basis of the result of calculated values for lag time, degree of cure and resin heat and a predetermined schedule of autoclave temperatures corresponding to the calculated values. Then new process data are read, the calculations repeated or updated and the autoclave temperature control established for the next interval.

This process control continues until the length of the cure cycle reaches an acceptable limit, provided the part temperature is maintained sufficiently long.

The system continually monitors the operating performance of thermocouples located oil or adjacent the part being processed and the operating integrity of the vacuum bag containing the part. The control responds to failure of a thermocouple by disregarding the signal associated with the failed thermocouple. Upon failure of the vacuum bag, the control decides whether to continue or discontinue the cure oil the basis of process specification requirements stored in electronic memory accessible to the computer or processor.

These objects and other objects, features and advantages of the invention are readily apparent from the following detailed description of the best mode for carrying out the invention when taken in connection with the accompanying drawings.

DESCRIPTION OF THE PREFERRED EMBODIMENT

Figure 1:
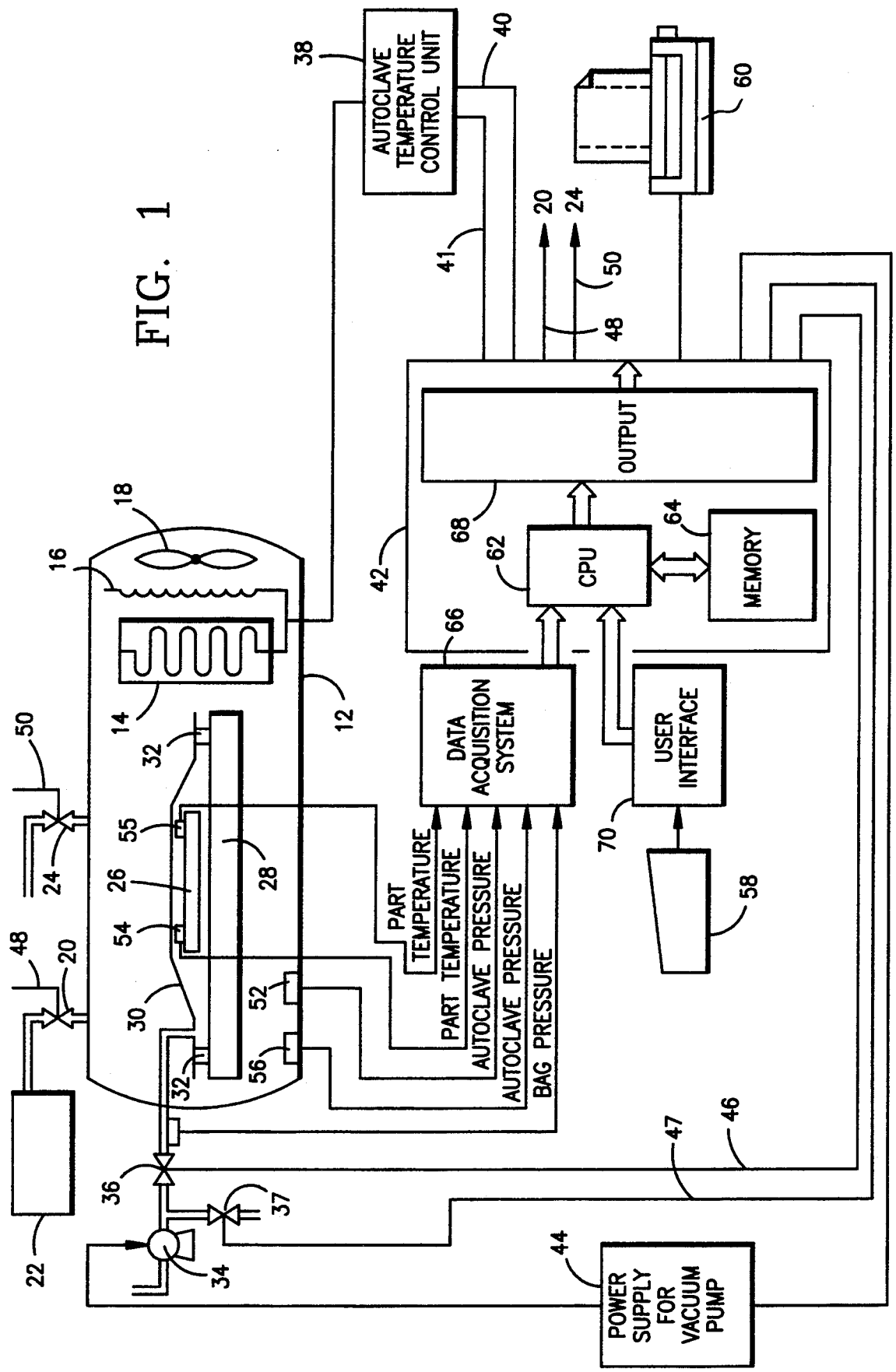
FIG. 1 is a schematic diagram showing the arrangement of the apparatus for molding and curing composite material in an autoclave and the system according to this invention for controlling the process.

Referring now to FIG. 1, the apparatus includes an autoclave 12, a pressurized chamber about 30 feet long, an autoclave temperature control device including a suitable heating element 14, a gas-fired burner; cooling element 16, and fan 18. The burner is connected to a source of natural gas or another energy source, such as an electric power supply. In either case, the heater and cooler are controlled automatically preferably through electrical or electronic means. Several electrically operated valves, valve 20 for opening and closing a source of pressurized nitrogen gas 22 to the autoclave and valve 24 for venting gas from the autoclave are also controlled automatically in response to computer output communicated to autoclave control equipment.

Layers of the composite material, one layer of composite upon another layer until the required number of layers is reached and the part has the requisite thickness, each layer having an outer contour conforming to the shape of the part 26 to be cured, are placed on a bag molding tool 28 that defines the surface of the part. The resin of the composite is substantially as received from the fabricator, i.e., in the B-stage condition. The part is covered with a bag 30 of thin flexible film, closed airtight by a seal 32 at its periphery, and connected to a vacuum source, such as a vacuum pump 34, through an electrically actuated valve 36, thereby producing a pressure difference between the interior of the bag and the autoclave. Valve 37 operates automatically to open the contents of the bag to atmospheric pressure.

The internal temperature of the autoclave is controlled through operation of an autoclave temperature control unit 38 that changes the operating states of the gas burner or cooler in response to output control signals carried on lines 40, 41 from a computer or microprocessor 42.

A power supply 44 for selectively energizing and deenergizing the vacuum pump 34 responds to control signals carried on line 45 from a computer output terminal. Automatic valves 36 and 37 are controlled by computer control signals carried on lines 46, 47 in accordance with the need to change pressure in the bag 30. Automatic valves 20 and 24 are controlled also by computer control signals carried on lines 48, 50 in accordance with a requirement to change autoclave pressure by venting the autoclave to atmosphere or opening a source of nitrogen gas 22 to the interior of the autoclave. These actions occur in response to control signals produced by the computer as control algorithms are executed.

Thermocouples 52, located at various points within the autoclave, produce signals representing temperature in the autoclave supplied as input to a data acquisition system 66. Temperature at distributed locations on part 26 is represented by signals produced by thermocouples 54, 55 connected to the data acquisition system 66. Typically thermocouples are located in the part midway through its thickness or depth, on the centerline of a long dimension and about one inch from an outer edge. Thermocouples are applied in whatever number and location and are required to provide representative information as the cure cycle proceeds, but they are preferably located in an area of the part that will be trimmed and scraped after curing.

Pressure within the autoclave is detected by pressure sensors and transducers 56 that produce signals representing autoclave pressure, additional process data carried to the data acquisition system.

A keyboard 58, connected through a user interface 70 to the computer, provides communication between the cure process and the operator so that user commands are accepted and processed to display cure process information at an output station 60 when requested. It graphically displays temperatures of the part and ambient autoclave temperature. Signals representing process data produced by the pressure and temperature sensors are received by the data acquisition system 66, which may be a Hewlett Packard data acquisition system, which is read and controlled directly through drivers running under computer control and communicating with the central processing unit 62 of the computer 42. Data buses interconnect the central processing unit 62, electronic ROM and RAM 64, data acquisition system 66, and output ports 68. Digital data produced as output by the computer are used to produce appropriate responses in the equipment that controls autoclave conditions, such as the automatic valves, heating and cooling elements, and vacuum pump.

The electronic memory 64 contains all the software modules needed to determine the pressures and temperatures required for an optimal cure. The cure executive monitors performance by reading all autoclave sensor data from the interface at 30 second intervals. The executive issues control commands at 30 second intervals to the autoclave interface so that the state of the heater, cooler, automatic valves, vacuum pump and other process equipment can be changed automatically at 30 second intervals in response to these executive commands. The commands indicate the temperature, pressure and vacuum settings needed to follow a prescribed cure.

The executive receives a temperature profile for the prescribed cure from a cure process model, which determines the proper temperature setting of the autoclave for a given time to produce optimal cure of the part. The cure process model receives repetitively from the executive current temperature readings of the autoclave and part and a time value. It uses this information throughout the cure cycle to determine the resin heat and the autoclave temperature setting needed to maintain the optimal cure profile. It provides minimum soak time, a specific minimum temperature for a minimun period for each thermocouple on the part, which can be used to override the optimal cure profile temperature to insure that the part has remained within the soak temperature range for the period specified by the soak time.

After the computer control system is initialized by initializing the equipment files, global parameters and user interface, then the main process is entered. A scheduled wake-up is executed to schedule each cycle through the control software on 30 second intervals. Each cycle first verifies that the cycle time has not been exceeded and then obtains all cure process data for the current cycle. The model calculates the next optimal autoclave temperature for each of the autoclave temperature sensors and chooses the most conservative of the optimal temperatures for the next temperature set point for the autoclave. On the basis of the new temperature set point, new set points for the autoclave equipment are sent to the sending driver for delivery to the autoclave.

Figure 2:
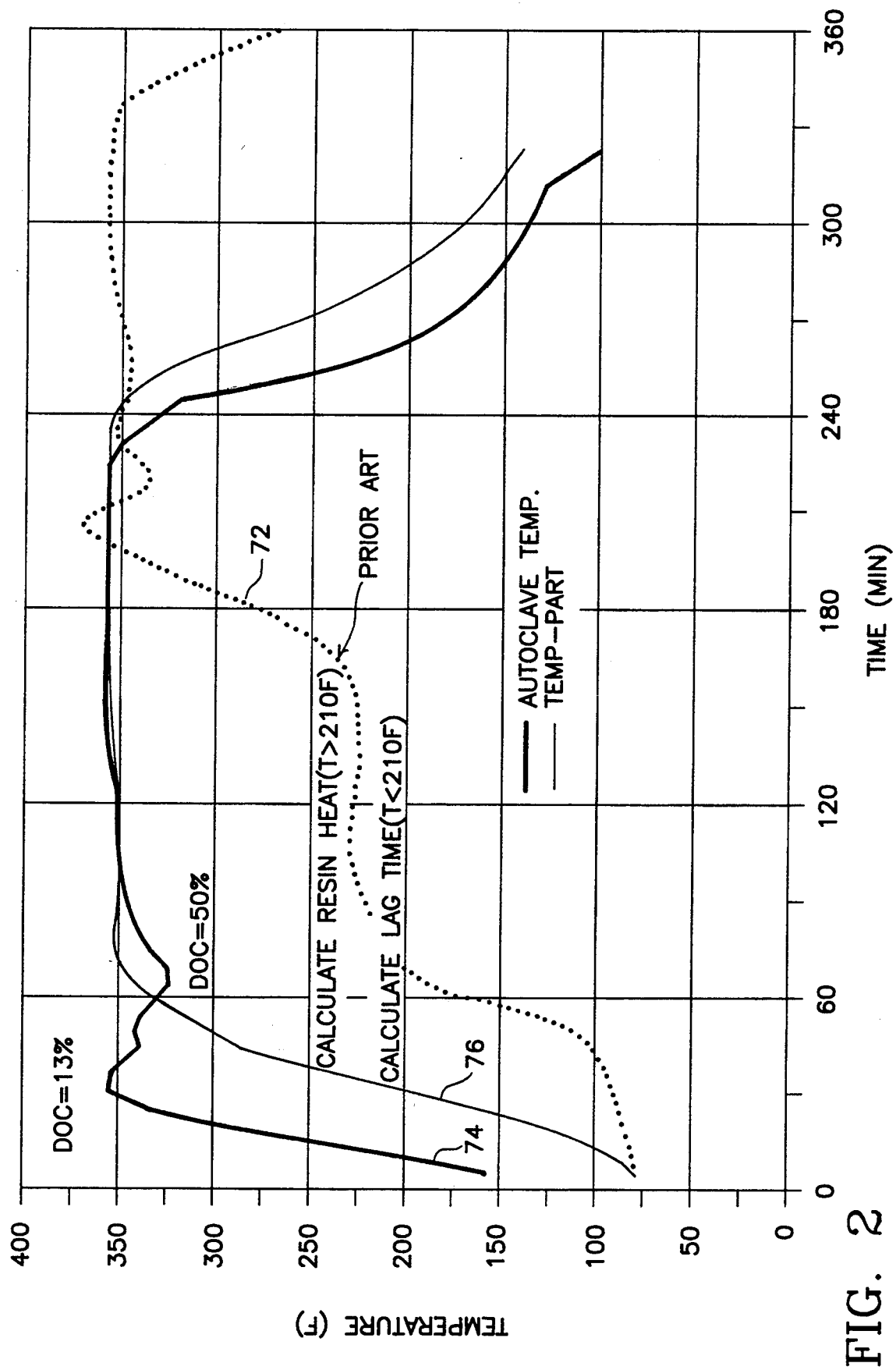
FIG. 2 is a graph showing the variation over time of autoclave temperature and temperature of a part whose cure cycle is controlled by the method of this invention. A reference graph of autoclave temperature vs time is included.

In FIG. 2, a conventional variation of part temperature during a cure cycle, wherein autoclave temperature is controlled by a method in the prior art, is represented by curve 72. Temperature increases from ambient room temperature during a heating phase to about 220 degrees F. where it is held until elapsed time reaches about 150 minutes. Then the temperature rises rapidly to about 350 degrees where it remains until about 310 minutes have elapsed. Finally, during a cooling phase, the temperature falls linearly for about one hour and the cure cycle is concluded.

FIG. 2 also illustrates graphs showing the variation over time of autoclave temperature 74 and part temperature 76 when the cure cycle is controlled by the method of this invention. The resulting reduction in length of the cure cycle by the optimal composite system (OCCS) is substantial. Although the cure is nominally at 350 degrees, the conventional cure process control causes substantial overheating, i.e. excessive temperature of the part above the object part temperature (355+/−10 degrees F.), due to the exothermal resin reaction. The overshoot attenuates over time and settles near the cure temperature. However, curve 76 shows that there is no part temperature overshoot when the cure is controlled according to this invention because the exothermal reaction is accounted for by the control. The parts represented by the curves of FIG. 2 were each 12 inch square panels of 128 plies of identical B-stage thermosetting resin systems supported on a graphite tool.

The OCCS heat phase extends from the beginning of the cure until all temperature sensors on the part indicate that the part temperature is maintained for a specified period (as determined by the relevant resin system or the product specifications of the manufacturer) and the degree of cure for each part temperature sensor, (as determined by the cure process model) is greater than 99 percent. The cool phase, which begins after these conditions are met, extends until all temperature sensors on the part are below a specified final temperature consistent with the resin system, whereupon the cure is completed.

Timing in the OCCS is controlled by a scheduled wake-up executed by the operating system at 30 second intervals. At the completion of each process loop, OCCS awaits the next scheduled wake-up. OCCS stops a cure by commanding the autoclave to a final temperature, pressure and vacuum state either widen a cure is completed or when the user concludes a cure manually through keyboard input.

Figure 3:
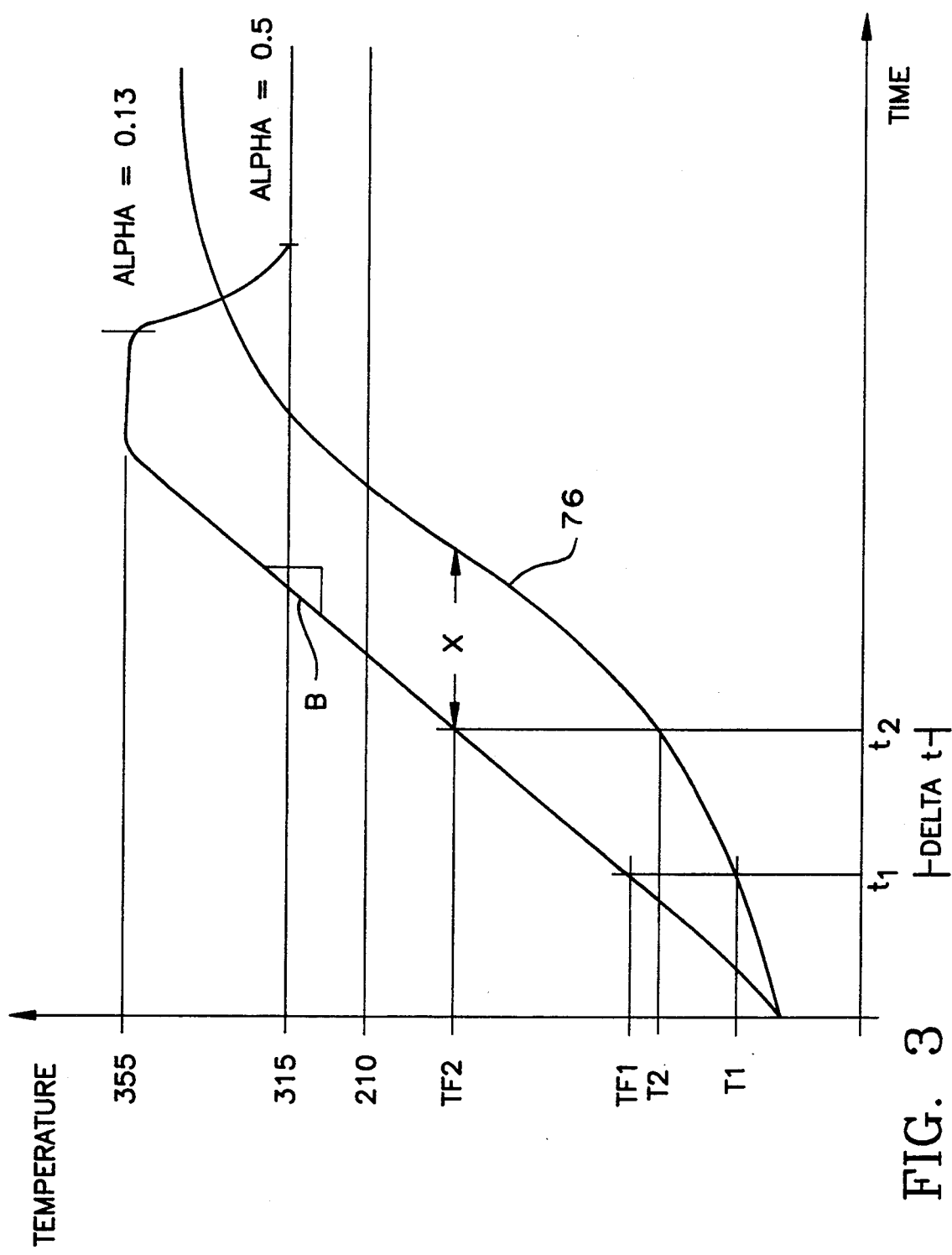
FIG. 3 shows in detail a portion of the graph of FIG. 2 near the heat ramp from room temperature to the cure temperature for a cure cycle controlled by the method of this invention.

FIG. 3 shows, for a cure cycle controlled by the method of this invention, that portion of the graph of FIG. 2 from room temperature to the cure temperature, about 355 degrees F. Certain variables and terms used in the process cure model are presented there graphically to aid in describing the calculations and concepts that follow. The OCCS is described with reference to the 3501-6 epoxy resin system available from Hercules Inc. The cure temperature is $355+/-10$ degrees F, the autoclave heat rate is about $10+/-0.3$ degrees per minute, and the part cool rate is about 5 degrees per minute. The relevant variables are defined as follows:

t is time;
DELTA t is time between successive executions of the process control model-30 seconds;
T1 is part temperature at time $t_1$;
T2 is part temperature at time $t_2$+DELTA t;
TC is a calculated value for T2
TF1 is autoclave gas temperature at time $t_1$
TF2 is autoclave temperature at $t_2$+DELTA t
B is autoclave gas temperature heat rate;
EXP is exponential function;
X is lag time;
ALPHA is degree of cure;
D(ALPHA)/DT is time rate of change of cure;
A1,A2,A3 are material properties of the resin;
DELTA AE1, DELTA AE2, DELTA AE3 are resin properties;
R is the universal gas constant;
T is temperature;
BETA is resin property.

Virtually no exothermal heat is produced in the resin between room temperature and 210 degrees; therefore, the OCCS calculates lag time, a measure of the effective thickness of the part, from the start of the cure cylcle at room temperature until the part temperature reaches 210 degrees. In FIG. 3, lag time is represented by the time (horizontal distance) between the autoclave heat ramp 74 and the part temperature 76 below 210 degrees.

From Newton's Law of cooling, a governing heat transfer equation for unsteady heat conduction is $$T2 - TF2 - X*B + (T1 - TF1 + X*B)*EXP(-DELTA\ t/X) \quad (1)$$

OCCS solves for lag time X by a nonlinear least squares method. The following equation is iterated until the difference in X between iterations is acceptably small $$X(k+1) = X(k) - F(X(k))/F\ (X(k))$$

Where F(X) is the least squared error, $$F(X) = \underset{k=1}{\overset{k=m}{SUM}}\ (TC\ (X(k)) - Y\ (k))**2 \quad (2)$$

Figure 4:
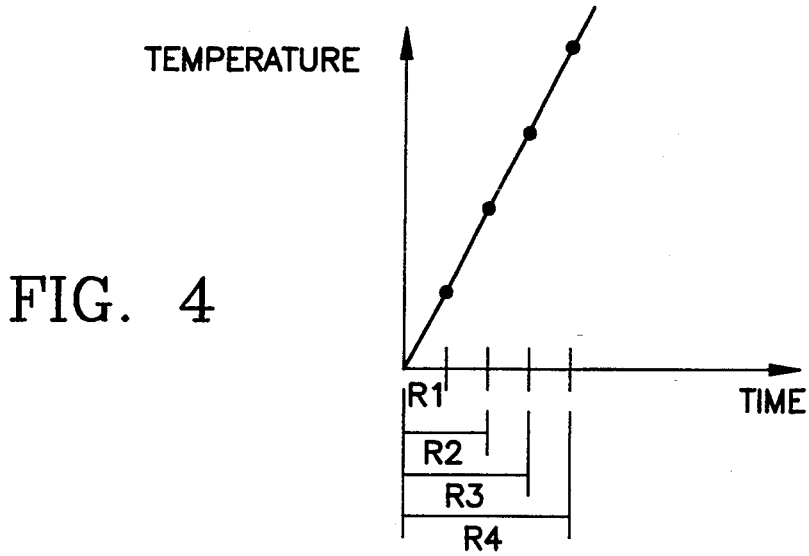
FIG. 4 is a diagram relating temperature and time used in the solution of the lag time equation.

A solution to the lag time equation (1) requires that an initial assumption for X be made, e.g., X=30. T2 is read from a temperature sensor on the part, and the calculated value for T2 is TC. Then equation (2) becomes $$F(X) = SUM\ (TC - T2)**2$$

where k=1, 2, 3 ... m as represented in FIG. 4.

Next the square error function is minimized by a suitable choice of X by solving $$dF(X)/dX = 0\ \text{for}\ X$$

Figure 5:
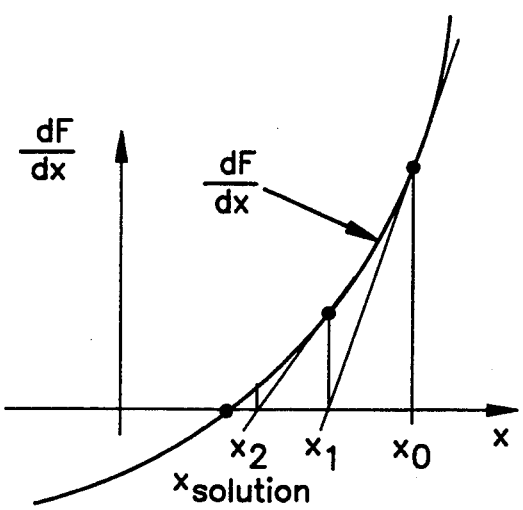
FIG. 5 is an example of a first derivative of the error function.

An example of a first derivative of the error function is illustrated in FIG. 5.

$$F(X) = \overset{m}{\underset{1}{SUM}}(TC - T2)**2$$

$$dF/dX = SUM\ 2(TC - T2)'\ d(TC)/dX\ \text{where}$$

$$dTC/dX = -B + B\ EXP(-DELTA\ t/X) + (T1 - TF1 + BX) *$$

$$EXP(-DELTA\ t/X) * (DELTA\ t/X**2$$

$$d^2F/dX^2 = (dF/dX]_2 - dF/dX]_1)/X2 - X1,\ \text{which yields}$$

$$X2 = X1 + (dF/dX]_2 - dF/dX]_1)/d^2F/dX^2$$

But $dF/dX]_2 = 0$. Therefore, the general form of the solution is $$X_{k+1} = X_k - F(X_k)/F'(X_k)$$

Degree of cure, ALPHA, the ratio of resin cure reaction heat at time t to the total heat of reaction, a dimensionless measure of the progress of the reaction, is calculated every 30 seconds throughout the entire cure cycle from the following equations $$d(ALPHA)/dT = (K1 + K2*ALPHA)\ (1 - ALPHA)\ (BETA - ALPHA) \quad (3)$$

if ALPHA is equal to or less than 0.3, and $$d(ALPHA)/dT = K3\ (1 - ALPHA) \quad (3)$$

if ALPHA is less than 0.3
where, $$K1 = A1\ EXP(-DELTA\ E1/R*T1)$$

$$K2 = A2\ EXP(-DELTA\ E2/R*T1)$$

$$K3 = A3\ EXP(-DELTA\ E3/R*T1)$$

This equation, the kinetic equation for Hercules' 3501-6 resin system, was derived empirically using data obtained from differential scanning calorimetry experimentation as described by Lee, Loos and Springer in the Journal of Composite Materials, 1982, Vol. 16, pp. 510-519. The entire disclosure of this article is herein incorporated by reference. OCCS integrates equations (3) over time to give a value for ALPHA (n), where n is a counter. Equations (3) are ordinary non-linear differential equations as functions of time. They are not solvable in closed form, but are solved by OCCS using the following iterative equation $$ALPHA(n+1) = ALPHA(n) + DELTA\ t*d(ALPHA)(n)/dt \qquad (4)$$

where ALPHA (1)=0.12 (for B-staged resin) and d(ALPHA) (1)/dt is known from the kinetic equation.

Figure 6:
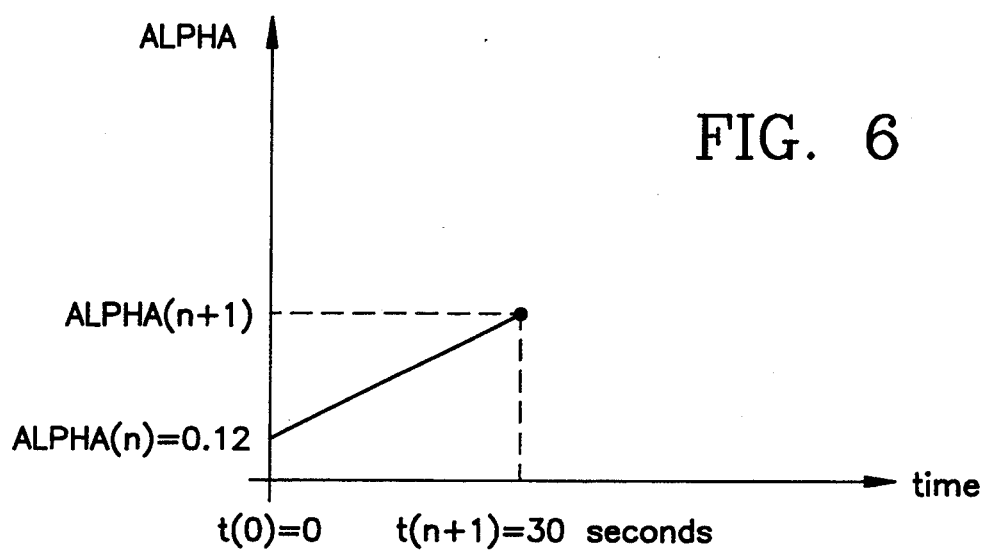
FIG. 6 represents a linear form of the solution of an equation used to solve iteratively for the degree of cure.

FIG. 6 represents the linear form of the solution of equation (4) (i.e., y=mx+b where the slope d(ALPHA) (n)/dt and the intercept ALPHA (1)=0.12 are known) and the approach for determining values for ALPHA corresponding to Resin heat, a function of lag time, theoretically the total quantity of heat energy due to polymerization present in the part. This energy is released in a narrow range of degree of cure; therefore a single maximum offset is acceptable. Resin heat is calculated repetitively after part temperature reaches 210 degree F. to the end of cure from the following governing heat transfer equation for unsteady heat conduction superimposed on resin heat of reaction.

$$T2 - TF2 - X*B + (T1 - TF1 + X*B)*EXP(-DELTA\ t/X) + DELTA\ T\ (d\ ALPHA/dt)\ (RESIN\ HEAT) \qquad (5)$$

Figure 8:
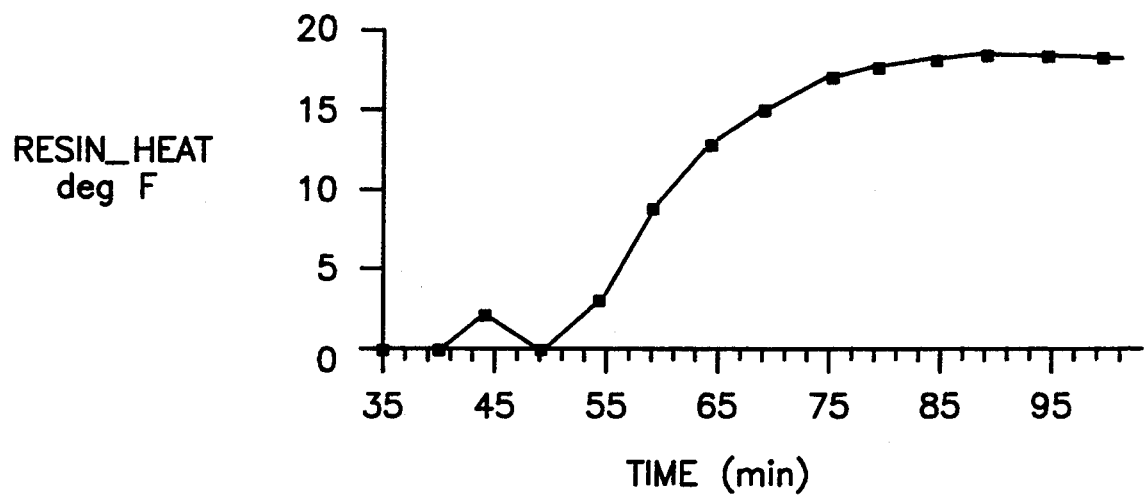
FIG. 8 shows the convergence using the least squares fit to compute resin heat.
Figure 9:
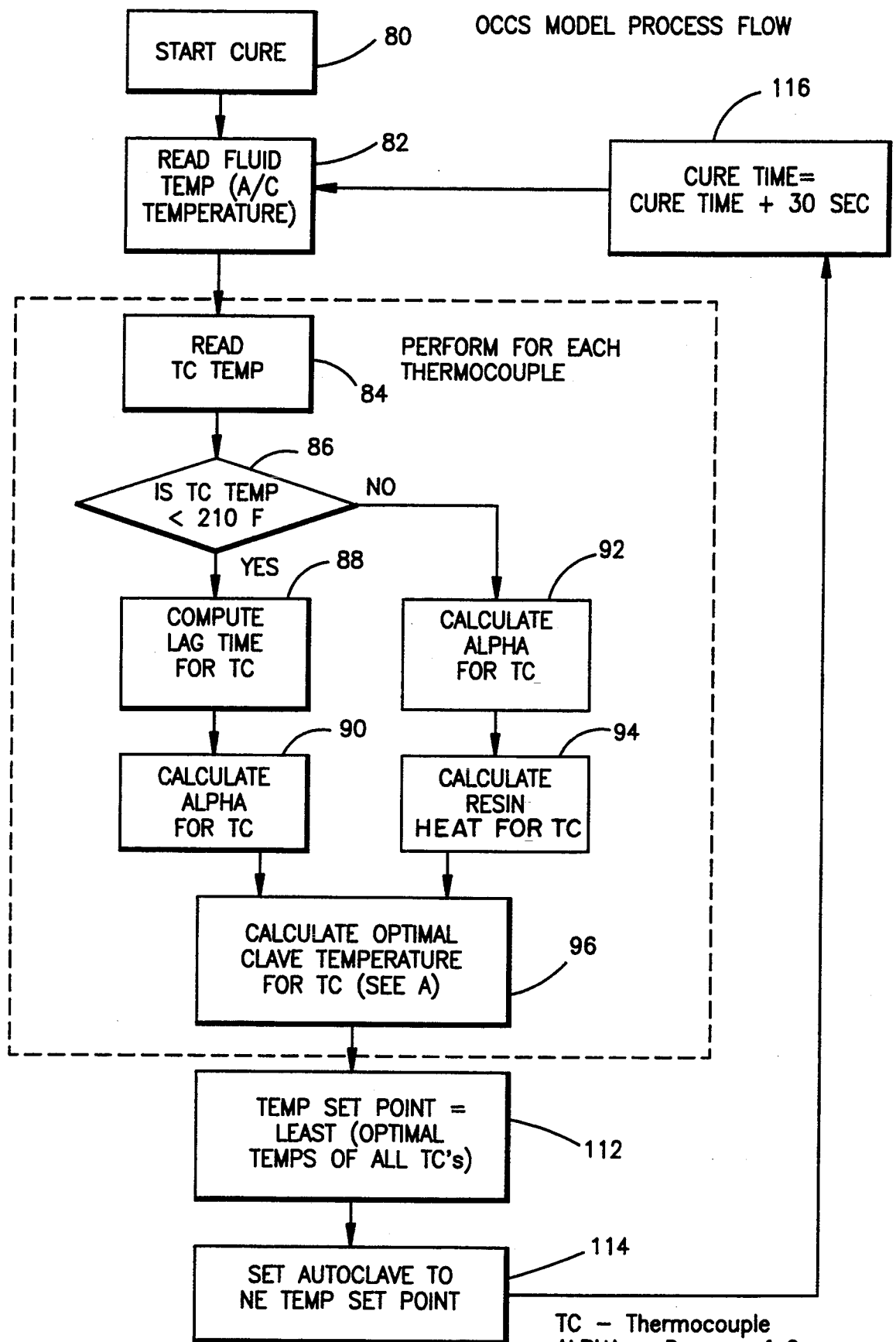
FIGS. 9 and 10 represent graphically the logic used by the control system for commanding optimum autoclave temperature during the cure cycle.

Equation (5) can be recognized as equation (1) with additional terms accounting for resin heat as a heat source after the part temperature reaches 210 degrees, in addition to the autoclave heat source. OCCS calculates resin heat from equation (5) by the nonlinear least squares method described above for the solution to equation (1). FIG. 8 shows the convergence using the least squares fit to compute resin heat. After lag time, resin heat and degree of cure are calculated, OCCS determines the appropriate optimal autoclave temperature throughout the cure cycle according to the following schedule:

If ALPHA is equal to or less than 0.13, then the optimal autoclave temperature equals the heatup rate, 10+/−0.3 degrees per minute;

If ALPHA is greater than 0.13 and less than 0.5 then the optimal autoclave temperature equals 355−(max offset) (ALPHA−0.13)/(0.5−0.13)

If ALPHA is greater than 0.5 and equal to or less than 0.99 then the optimal autoclave temperature equals 355−(max offset) (1.0−ALPHA)/(1.0−0.5)

If ALPHA is greater than 0.99 and the soak time is equal to or greater than two hours then the optimal autoclave temperature equals the cool down rate, about five degree per minute.

When the degree of cure reaches about 13 percent, exothermal heat begins to rise and to affect the temperature of the part to such an extent that the autoclave temperature must decrease thereafter for a period to avoid overheating the part. After reaching 13 percent degree of cure, the autoclave temperature is reduced by an amount called offset while exothermal heat increases in magnitude until the degree of cure reaches about 50 percent, where exothermal heat reaches a maximum and begins to decline to insignificance. Thereafter, as the resin reaction progresses, ambient autoclave temperature is increased to compensate for the continued decline in exothermal heat until part temperature stabilizes at the cure temperature, where it is held until completion of the soak or cure period. FIGS. 2 and 3 show the reduction in autoclave temperature that begins at about 13 percent degree of cure (near 355 degrees F.) and continues to about 50 percent degree of cure (near 325 degrees F.). Maximum offset is the decrease in autoclave temperature from its temperature at the degree of cure where exothermal heat becomes significant to its temperature where exothermal heat is a maximum.

Generally, offset is determined empirically. According to a preferred technique, sample parts of B-stage resin composite material of various thicknesses representative of the thickness of production parts, perhaps in the range between 12 plies and 128 plies, are prepared, placed in a film bag, the bag evacuated, time samples supported on a tool and these placed in an autoclave, preferably the autoclave where the production parts will be cured. The autoclave is pressurized, the ambient temperature raised to the cure temperature, and that temperature held for the requisite soak period until the cure is completed. Sample temperature is monitored from thermocouples on the samples. If the autoclave temperature is set for cure at 355 degrees F., the sample temperature can be expected to reach about 370 degrees F. Lag time, degree of cure, and resin heat zero are calculated repetitively as described above. FIG. 11-14 show for various constant lag times the relationship between degree of cure and resin heat. The resin heat established by sample testing is called resin heat zero.

Offset is determined from the following relationships
Offset=output*max offset
output=((alpha−doc1)/(doc2−doc1))**power
power=fall power, if doc1 is between alpha and doc2
power=rise power, if doc2 is between alpha and doc3

For the Hercules resin system referred to above doc1 is 0.13; doc2 is 0.5; and doc3 is 0.8 in units of degrees of cure, i.e., percent. Rise power is 0.8 and fall power is 1.0, both dimensionless constants.

Figure 7:
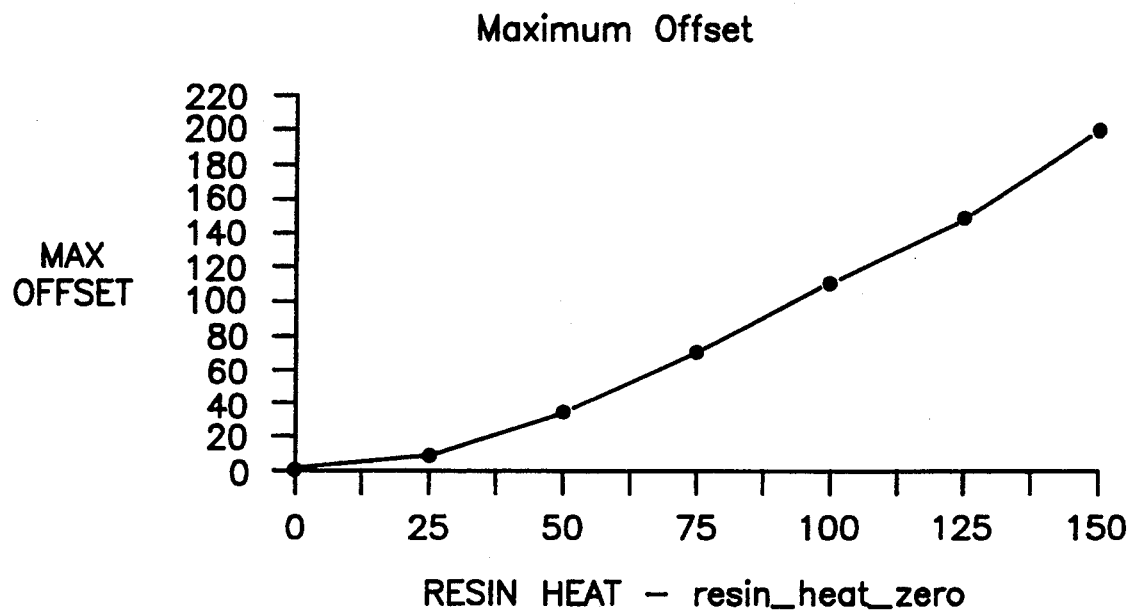
FIG. 7 is a graph showing the relation between resin heat minus resin heat zero and maximum offset.

From the current value for alpha, which is calculated frequently at discrete intervals during the cure, the values of power and output are calculated from the equations above. From the current values for lag time and alpha and the information derived from sample testing, resin heat zero can be interpolated from the information of FIGS. 11-14, which is stored in electronic memory. Resin heat zero is subtracted from the current calculated value for resin heat and the resulting value is used to determine max offset from the information contained in FIG. 7, which is also stored in electron memory. Finally current offset is calculated from the product of output times max offset.

The logic used by OCCS for repetitively commanding the optimum autoclave temperature at each 30 second interval during the cure cycle is set forth in FIGS.

9 and 10. Block 80 represents the start of the cure cycle after the autoclave equipment, pressure, vacuum and computer system have been initialized. The autoclave gas temperature is read at 82, and part temperature from all thermocouples TC on the part is read at 84. At 86 a test is made comparing part temperature to 210 degrees, the temperature below which the exothermal heat for the resin being cured is insignificant. If test 86 is true, control passes to 88, where lag time is computed, and then to 90 where ALPHA is calculated. If test 86 is false, control passes to 92, where ALPHA is calculated, and then to 94 where resin heat is calculated.

Figure 10:
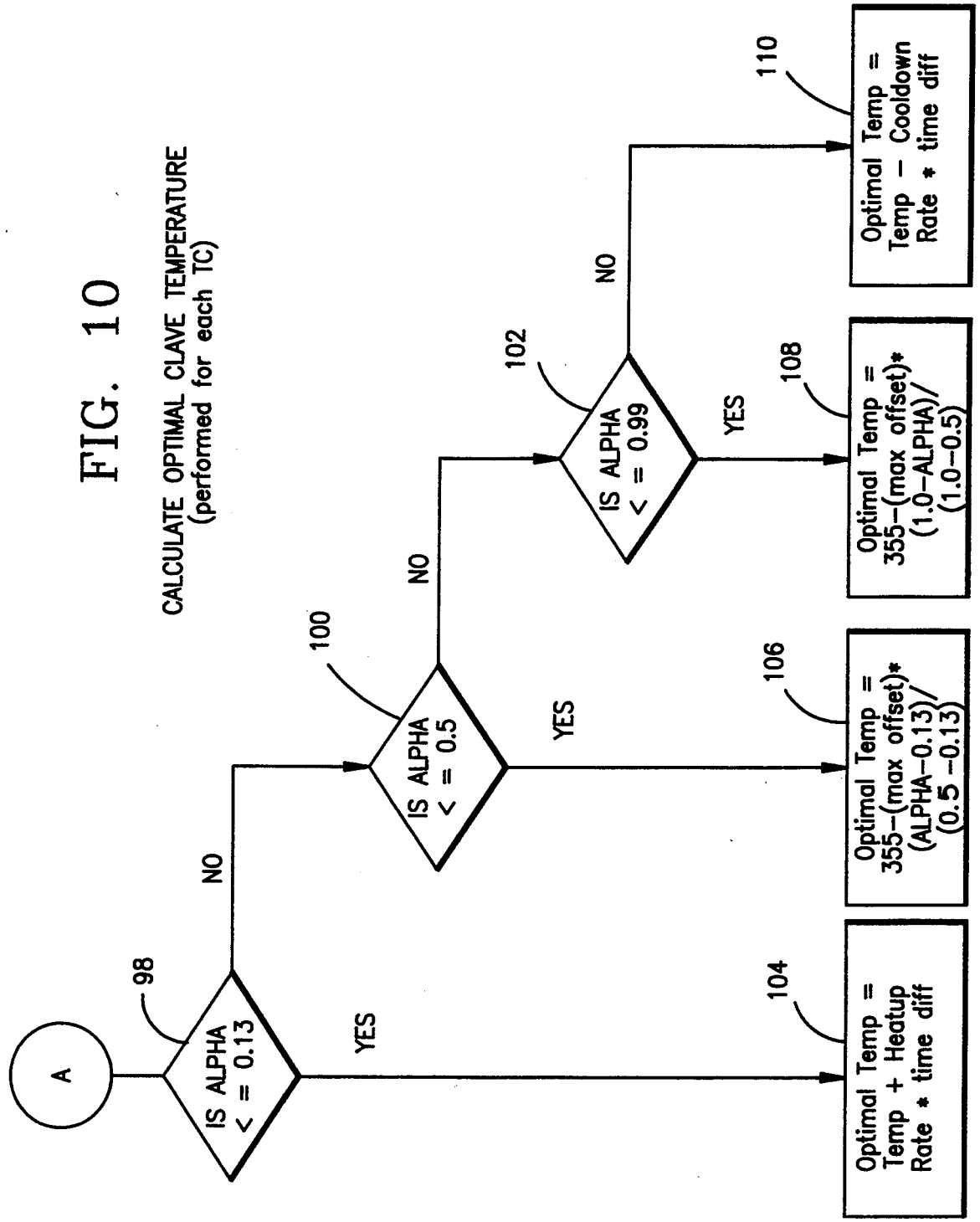
Figure 11:
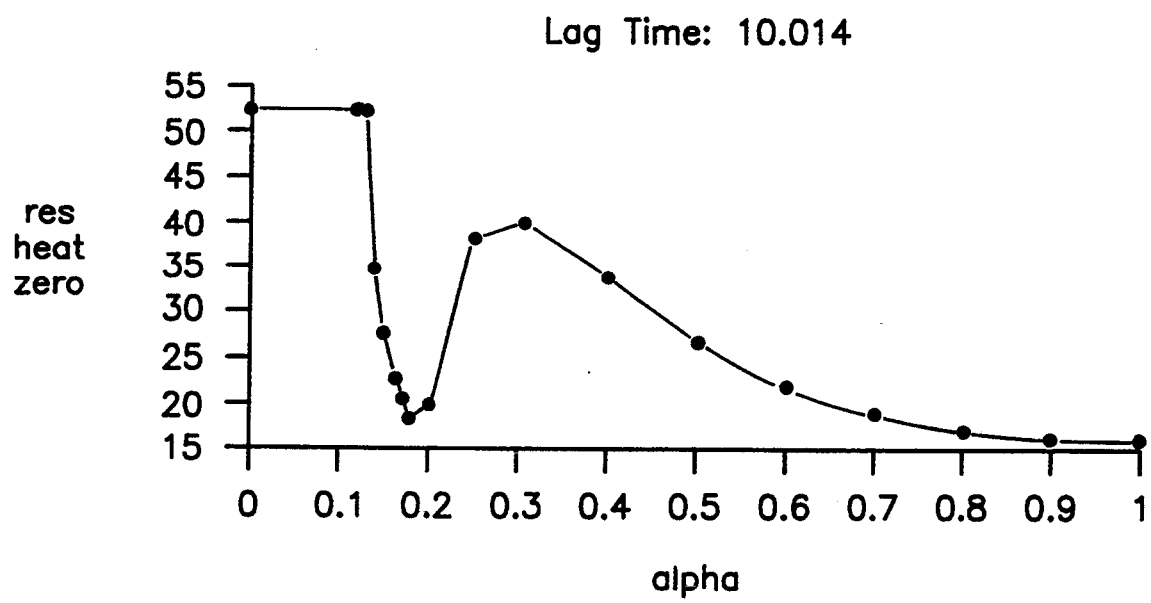
FIGS. 11–14 show data derived empirically relating degree of cure and resin heat zero for a range of discrete lag times.
Figure 12:
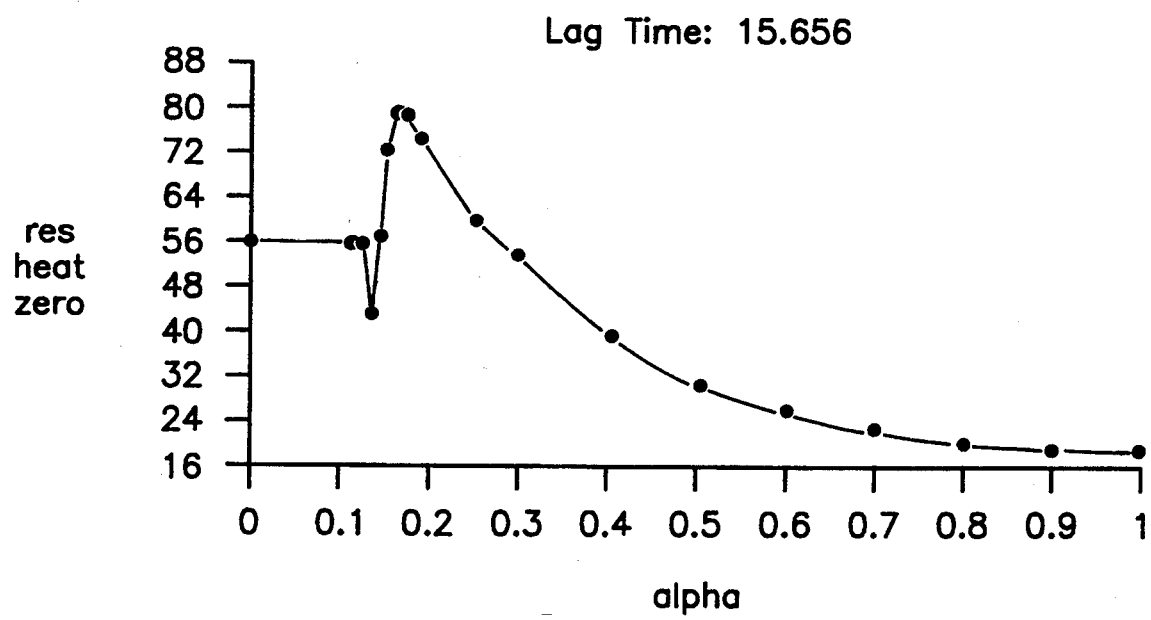
Figure 13:
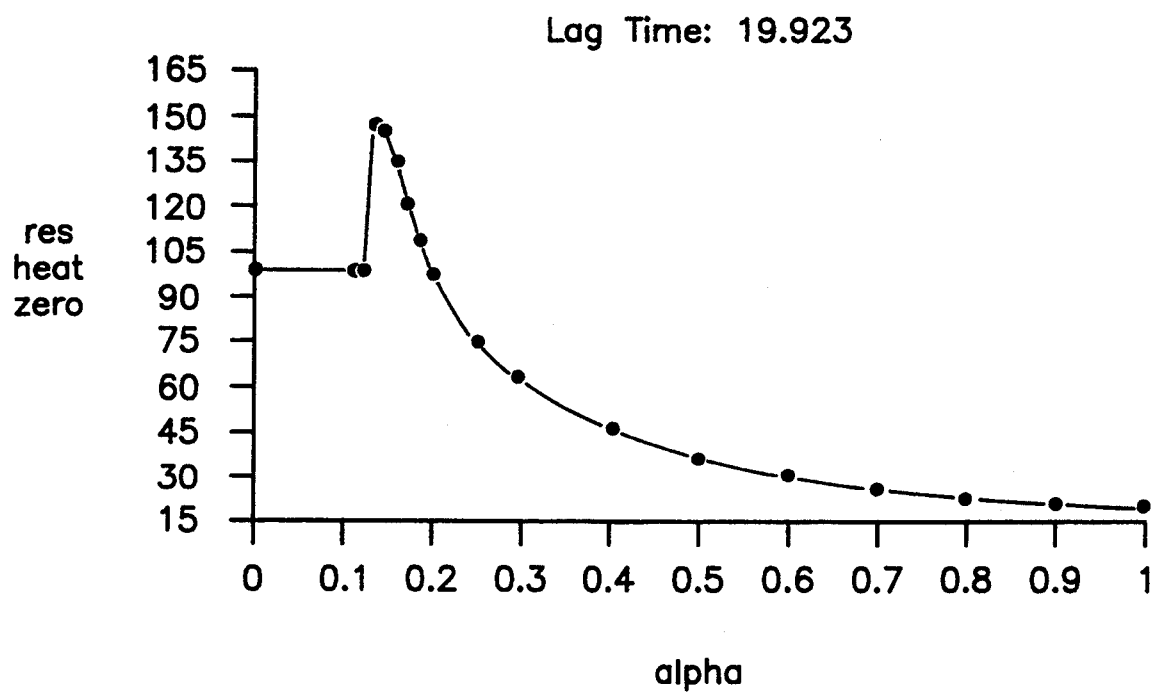
Figure 14:
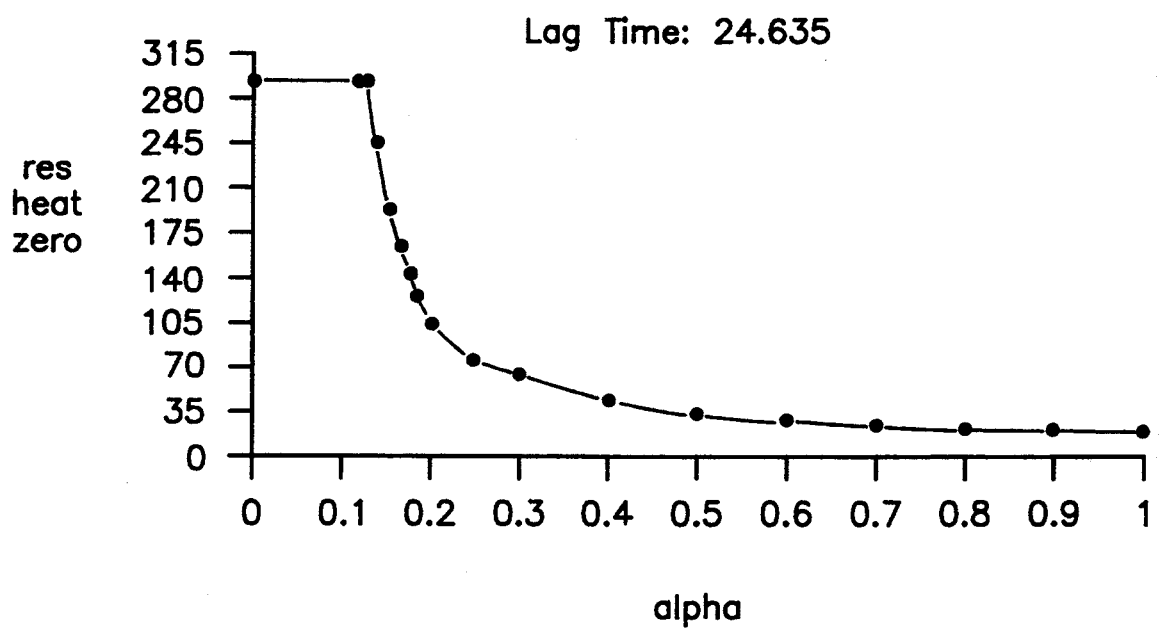

Next, at 96, control is directed to the logic of FIG. 10 where, at 98 the optimal autoclave temperature for each thermocouple on the part TC is determined by testing ALPHA against 0.13. If test 98 is false, ALPHA is tested against 0.50 at 100. If test 100 is false, ALPHA is tested against 0.99 at 102. Accordingly the optimal autoclave temperature is determined either at 104, 106, 108, or 110. Thereafter control passes to 112 where the temperature set point is set equal to the optimal temperature for the lowest part TC temperature. The cure profile, the temperature set point as a function of cure time, is specified to the executive module, which adjusts autoclave temperature by adjusting the level of heating and cooling as a function of the difference between the temperature set point and the actual autoclave temperature. The set point is used to command at 114 a change in the autoclave heater or cooler state, thereby producing a corresponding change in the ambient autoclave temperature to that of the optimal temperature. Then, cure time is incremented by 30 seconds at 116 and control passes again to 82 and the process model is executed again.

It can be seen from this description that a process for curing parts made of fiber-reinforced composite material in an autoclave according to this invention operates with the aid of a digital computer that uses data acquired during processing to calculate repetitively the temperature of the autoclave required to establish and maintain a predetermined cure temperature. The control system accounts for heat generated by the exothermal reaction of the resin during polymerization and recalculates an optimal autoclave temperature at periodic intervals during the cure cycle on the basis of temperature data acquired at corresponding periodic intervals. The optimal autoclave temperature is determined from repetitively calculated values representing resin heat, maximum offset, lag time and degree of cure of the resin during execution of control algorithms stored in electronic memory accessible to the processor. Control signals produced by the computer cause corresponding changes in the temperature of the autoclave needed to cure the part without overheating and in less time than with a conventional autoclave temperature control.

While the best mode for carrying out the invention has been described in detail, those familiar with the relevant art will recognize various alternative designs and embodiments for practicing the invention defined by the following claims.

We claim:

1. A method for controlling the curing process of a part formed of fiber-reinforced thermosetting resin composite material in an autoclave with the aid of a digital computer, comprising the steps of:

placing a part of composite material in an autoclave and initiating a curing process of the part;

repetitively measuring the temperature of the autoclave during the curing process;

repetitively measuring the temperature of the part during the curing process;

repetitively measuring the time elapsed during the curing process;

increasing the autoclave temperature;

providing the computer with autoclave temperature, part temperature, elapsed time, and properties of the resin repetitively calculating in the computer at frequent intervals during the curing process lag time before the temperature of the part being cured rises to a predetermined temperature lower than a temperature where resin reaction produces heat;

repetitively calculating in the computer at frequent intervals during the curing process the degree of cure;

repetitively determining in the computer at frequent intervals during the curing process the time rate of change of the degree of cure;

repetitively calculating resin heat in the computer at frequent intervals during the curing process after the part temperature exceeds the predetermined temperature;

repetitively determining the maximum offset in the computer at frequent intervals;

determining optimal autoclave temperature from current degree of cure and current maximum offset; and changing current autoclave temperature to the current optimal autoclave temperature.

2. The method of claim 1 further comprising the steps of:

continuing to change the temperature of the autoclave until the elapsed time reaches a predetermined limit; and reducing the temperature of the autoclave at a predetermined rate until the temperature of the part to be cured reaches the optimal autoclave temperature.

3. The method of claim 1 further comprising the steps of:

supporting the part to be cured on a support surface;
sealing the part to be cured air-tight in a space;
evacuating said space during the curing process; and
forcing the part into contact with the support surface by pressurizing the ambient atmosphere.

4. The method of claim 2 further comprising the steps of:

supporting the part to be cured on a support surface;
sealing the part to be cured air-tight in a space;
evacuating said space during the curing process; and
forcing the part to be cured into contact with the support surface by pressurizing the ambient atmosphere.

5. The method of claim 1 wherein the resin is epoxy.

6. The method of claim 1 wherein the fiber is selected from the group consisting of glass, boron, graphite, carbon and organic fiber.

7. The method of claim 1 wherein the temperature of the autoclave, the temperature of the part to be cured and the elapsed time are measured substantially concurrently at predetermined intervals during the curing process, and wherein the lag time is calculated from the following relationship:

$$T2 = TF2 - X*B + (T1 - TF1 + X - B)*EXP(-DELTA\ t/X)$$

wherein t is time;

DELTA is the time between successive intervals;

T1 is the temperature of the part to be cured at time $t_1$;

T2 is the temperature of the part to be cured at time $t_2+$DELTA t;

TF1 is the temperature of the autoclave at time $t_1$;

TF2 is the temperature of the autoclave at $t_2+$DELTA t;

B is the temperature of the autoclave heat rate;

EXP is an exponential function;

X is the lag time.

8. The method of claim 1 wherein the temperature of the autoclave, the temperature of the part to be cured and the elapsed time are measured substantially concurrently at predetermined intervals during the curing process, and wherein the degree of cure, ALPHA, is calculated from the following relationships:

$$d(ALPHA)/dT = (K1 + K2*ALPHA)(1-ALPHA)(BETA-ALPHA)$$

if ALPHA is equal to or less than 0.3, and $$d(i\ ALPHA)/dT = K3\ (1-ALPHA)$$

if ALPHA is less than 0.3 where, $$K1 = A1\ EXP(-DELTA\ E1/R*T1)$$

$$K2 = A2\ EXP(-DELTA\ E2/R*T1)$$

$$K3 = A3\ EXP(-DELTA\ E3/R*T1)$$

t is time;

DELTA t is time between successive intervals;

T1 is the temperature of the part to be cured at time $t_1$;

T2 is the temperature of the part to be cured at time $t_2+$DELTA t;

EXP is an exponential function;

D(ALPHA)/DT is the time rate of change of cure;

A1, A2, A3 are material properties of the resin;

DELTA AE1, DELTA AE2, DELTA AE3 are resin properties;

R is the universal gas constant;

T is temperature; and

BETA is a resin property.

9. The method of claim 1 wherein the temperature of the autoclave, the temperature of the part to be cured and the elapsed time ae measured substantially concurrently at predetermined intervals during the curing process, and wherein the lag time is calculated fro the following relationships:

$$T2 = TF2 - X*B + (T1 - TF1 + X*B)*EXP(-DELTA\ t/X) + DELTA\ T\ (d\ ALPHA/dt)\ (RESIN\ HEAT)$$

$$T2 = TF2 - X*B + (T1 - TF1 + X - B)*EXP(-DELTA\ t/X)$$

wherein t is time;

DELTA t is the time between successive intervals;

T1 is the temperature of the part to be cured at time $t_1$;

T2 is the temperature of the part to be cured at time $t_2+$DELTA t;

TF1 is the temperature of the autoclave at time $t_1$;

TF2 is the temperature of the autoclave at $t_2+$DELTA t;

B is the temperature of the autoclave heat rate;

EXP is an exponential function;

X is a lag time; and

D(ALPHA)/DT is the time rate of change of the degree of cure.

10. A method for controlling the curing process of a part formed of fiber-reinforced thermosetting resin composite material, comprising the steps of:

measuring the ambient temperature surrounding the part to be cured;

measuring the temperature of the part to be cured;

measuring the time elapsed during the curing process;

increasing the ambient temperature;

calculating the lag time from the ambient temperature and the temperature of the part to be cured before the temperature of the part to be cured rises to a predetermined temperature lower than the temperature where resin reaction produces heat;

calculating the degree of cure from the temperature of the part to be cured and the properties of the resin;

determining the time rate of change of the degree of cure;

calculating resin heat from the ambient temperature, the temperature of the part to be cured and the time rate of change of the degree of cure after the temperature of the part to be cured exceeds the predetermined temperature;

determining maximum offset;

determining the optimal temperature of the autoclave from the degree of cure and the maximum offset; and changing the ambient temperature to the optimal temperature of the autoclave.

11. The method of claim 10, further comprising the steps of:

supporting the part to be cured on a support surface;

sealing the part to be cured air-tight in a space;

evacuating said space during the curing process; and forcing the part into contact with the support surface by pressurizing the ambient atmosphere.

12. The method of claim 10 wherein the resin is epoxy.

13. The method of claim 10 wherein the fiber is selected from the group consisting of glass, boron, graphite, carbon and organic fiber.

14. The method of claim 10 wherein the ambient temperature, the temperature of the part to be cured and the elapsed time are measured substantially concurrently at predetermined intervals during the curing process, and wherein the lag time is calculated from the following relationship:

$$T2 = TF2 - X*B + (T1 - TF1 + X*B)*EXP(-DELTA\ t/X)$$

wherein t is time;

DELTA t is the time between successive intervals;

T1 is the temperature of the part to be cured at time $t_1$;

T2 is the temperature of the part to be cured at time $t_2+$DELTA t;

TF1 is the ambient temperature at time $t_1$;
TF2 is the ambient temperature at $t_2 + DELTA\ t$;
B is the ambient temperature heat rate;
EXP is an exponential function; and
X is the lag time.

15. The method of claim 10 wherein the ambient temperature, the temperature of the part to be cured and the elapsed time are measured substantially concurrently at predetermined intervals during the curing process, and wherein the degree of cure ALPHA is calculated from the following relationships:

$$d(ALPHA)/dT = (K1 + K2*ALPHA)(1 - ALPHA)(BETA - ALPHA)$$

if ALPHA is equal to or less than 0.3, and $$d(ALPHA)/dT = K3(1 - ALPHA)$$

if ALPHA is less than 0.3
where, $$K1 = A1\ EXP(-DELTA\ E1/R*T1)$$

$$K2 = A2\ EXP(-DELTA\ E2/R*T1)$$

$$K3 = A3\ EXP(-DELTA\ E3/R*T1)$$

t is time;
DELTA t is the time between successive intervals;
T1 is the temperature of the part to be cured at time $t_1$;
T2 is the temperature of the part to be cured at time $t_2 + DELTA\ t$;
EXP is an exponential function;
D(ALPHA)/DT is the time rate of change of cure;
A1, A2, A3 are material properties of the resin;
DELTA AE1, DELTA AE2, DELTA AE3 are resin properties;
R is the universal gas constant;
T is temperature; and
BETA is a resin property.

16. The method of claim 10 wherein the ambient temperature, the temperature of the part to be cured and the elapsed time are measured substantially concurrently at predetermined intervals during the curing process, and wherein the lag time is calculated from the following relationships:

$$T2 = TF2 - X*B + (T1 - TF1 + X*B)*EXP(-DELTA\ t/X) + DELTA\ T\ (d\ ALPHA/dt)(RESIN\ HEAT)$$

$$T2 = TF2 - X*B + (T1 - TF1 + X*B)*EXP(-DELTA\ t/X)$$

wherein
t is time;
DELTA t is the time between successive intervals;
T1 is the temperature of the part to be cured at time $t_1$;
T2 is the temperature of the part to be cured at time $t_2 + DELTA\ t$;
TF1 is the ambient temperature at time $t_1$
TF2 is the ambient temperature at $t_2 + DELTA\ t$;
B is the ambient temperature heat rate;
EXP is an exponential function;
X is the lag time; and
D(ALPHA)/DT is the time rate of change of degree of cure.

17. The method of claim 10 further comprising the steps of:
continuing to change the ambient temperature until the elapsed time reaches a predetermined limit; and
reducing the ambient temperature at a predetermined rate until the temperature of the part to be cured reaches the optimal autoclave temperature.

18. A method for controlling the curing process of a part formed of fiber-reinforced thermosetting resin composite material, comprising the steps of:
measuring the ambient temperature surrounding the part during the curing process;
measuring the temperature of the part during the curing process;
measuring the time elapsed during the curing process;
increasing the ambient temperature;
calculating the lag time from the ambient temperature and the temperature of the part to be cured before the temperature of the part to be cured rises to a predetermined temperature lower than the temperature where resin reaction produces heat;
calculating the degree of cure from the temperature of the part to be cured and the properties of the resin;
determining the optimal autoclave temperature from the degree of cure; and
changing the ambient temperature to the optimal ambient temperature.

19. The method of claim 18 further comprising the steps of:
supporting the part to be cured on a support surface;
sealing the part to be cured air-tight in a space;
evacuating said space during the curing process; and
forcing the part into contact with the support surface by pressurizing the ambient atmosphere.

* * * * *